United States Patent

[11] 3,545,478

[72] Inventor Elmer H. Etgen
P.O. Box 4539, Lubbock, Tex. 79409
[21] Appl. No. 708,157
[22] Filed Feb. 26, 1968
[45] Patented Dec. 8, 1970

[54] IRRIGATION SYSTEM
12 Claims, 14 Drawing Figs.
[52] U.S. Cl. ................................................. 137/344, 285/5
[51] Int. Cl. ................................................. B60p 3/30
[50] Field of Search ........................................... 239/212; 137/344; 285/325, 5, 6, 62; 351/(Inquired)

[56] References Cited
UNITED STATES PATENTS
| | | | |
|---|---|---|---|
| 2,187,119 | 1/1940 | Fish | 285/5 |
| 2,670,222 | 2/1954 | Dragon | 285/6 |
| 2,766,996 | 10/1956 | Jacoby | 285/5 |
| 2,823,807 | 2/1958 | Hempel | 85.5X |
| 3,245,595 | 4/1966 | Purtell | 13/344X |
| 3,281,081 | 10/1966 | Purtell | 137/344X |
| 3,314,608 | 4/1967 | Curtis et al. | 137/344X |
| 3,360,200 | 12/1967 | Purtell | 137/344X |
| 3,361,360 | 1/1968 | Purtell | 137/344X |

Primary Examiner—M. Cary Nelson
Assistant Examiner—R. B. Rothman
Attorney—Smyth, Roston and Pavitt

ABSTRACT: This disclosure describes an irrigation system which is movable intermittently through a first lane or swath and then shiftable to an adjacent swath and moved intermittently therethrough. The system is self-propelled and may include a plurality of mobile carriage units for supporting an elongated main irrigation pipe and a plurality of drag lines pulled behind the carriage units.

IRRIGATION SYSTEM

BACKGROUND OF THE INVENTION

The present invention is directed to an irrigation system of the type which moves intermittently through one land or swath and is then shifted to an adjacent swath which is traversed in a similar intermittent manner. Such systems typically include a plurality of carriage units each of which includes a frame mounted on a track or wheels. A main irrigation pipe is connected to the carriage units and several trailing or drag lines are connected to the main irrigation pipe. One or more of the carriage units has a motor and constitutes a power unit.

The system is moved to a first station by the power unit and then stopped and the main irrigation pipe is connected to a fixed source of irrigation water which is distributed by the main irrigation pipe and several drag lines. When the first station has been adequately irrigated, the system is moved by the power unit to a second station at which it is connected to a second source of irrigation water. At the end of the swath, the wheels are pivoted through 90° and the main irrigation pipe is axially shifted to an adjacent swath where a similar intermitting procedure is repeated. Conventional systems of this type are deficient in several respects, some of which are discussed below.

With conventional systems, the drag line or trailing line is mechanically interconnected directly to the main irrigation pipe and the main irrigation pipe is supported at a substantial elevation above the ground by the several carriage units. The drag line, typically includes a conduit with sprinklers mounted thereon which are pulled along the ground behind the main irrigation pipe as the pipe is moved between stations. Not infrequently, the drag line becomes entangled with plants or various other items within the field to the extent that a substantial force is applied to the main irrigation pipe. This force may be sufficient to arrest movement of the main irrigation pipe to which it is attached. When this occurs, movement of the main irrigation pipe is reduced or stopped but the wheels of the carriage unit continue to rotate, and this causes the carriage units to, in effect, walk out from under the main irrigation pipe thereby causing the system to collapse and perhaps become damaged.

The drag line typically includes a conduit which is suitably secured to the lower side of the main irrigation pipe, and thus, the inlet or opening to the drag line is at the bottom of the main irrigation pipe. The irrigation water passing through the main irrigation pipe contains particulate matter which tends to flow along and accumulate on the lower side of the main irrigation pipe and with the inlet of the drag line being in such lower side of the main irrigation pipe, the particulate matter flows into the drag line conduit where it tends to clog the relatively small sprinkler outlets. In an attempt to avoid clogging of the sprinkler outlets, it has been necessary to employ relatively complex and expensive filter elements which increase the cost and complexity of the system.

The drag line of a conventional system includes a drag line conduit which extends in part along the ground. The drag line conduit includes several conduit sections releasably connected by couplings which also connect risers to the drag line conduit. A suitable sprinkler or series of orifices may be connected to each of the risers to distribute the water from the drag line. It is very important that the risers extend vertically above the drag line conduit to assure that the cone of water sprayed therefrom will be distributed evenly on either side of the drag line. Prior art connectors or couplings of this type have not been satisfactory in that they have employed a threaded type of attachment for securing the riser to the drag line. Threaded connections are not particularly easy to make or break and in addition may come loose to cause the adjacent coupling sections to turn relative to each other about a longitudinal axis to thereby cause the risers to project in a nonvertical fashion above the drag line conduit.

It is also desirable to provide an automatic draining feature for the drag line. One conventional system provides a special automatic drain member in the wall of the connector. Although this does perform the draining function, it would be desirable to simplify the construction of the connector and eliminate the need for a special drain mechanism therein.

Typically, the motor on the power unit drives an elongated drive shaft which extends from the power unit to all of the other carriage units. To permit intermittent driving of the carriage units, each of the carriage units is provided with a clutch for drivingly connecting and disconnecting the drive shaft and the wheels of the carriage. The conventional clutch of this type is usually of the gear type and may become inadvertently engaged or disengaged when contacted inadvertently by an external member. In addition, some prior art irrigation systems require two of these clutches for each of the carriage units thereby increasing the cost and complexity of the systems.

The main irrigation pipe usually includes several pipe sections which are joined to form the main irrigation pipe. In the past, setup of the irrigation system has been made more difficult because the pipe sections must be manually supported while the ends thereof are being joined together. This requires a relatively large work force to assemble the irrigation system and increase the likelihood of injury to one of the workmen during assembly of the main irrigation pipe.

SUMMARY OF THE INVENTION

The present invention is directed to an irrigation system and to various components thereof which generally overcome all of the problems noted above and heretofore experienced with prior art systems of this type. A basic concept of the invention is to reduce the tipping moment when motion of the drag line becomes resisted or arrested. In particular, the present invention teaches that the problem of the carriage walking out from beneath the main irrigation can be eliminated by directly mechanically joining the drag line conduit to the frame of the carriage unit rather than to the main irrigation pipe. With this arrangement, the drag line is attached directly to the frame at a point beneath, and preferably substantially beneath, the main irrigation pipe so that the moment caused by continued rotation of the wheels when movement of the drag line is resisted by plants, etc., is substantially reduced. In a preferred form of the invention, the frame includes a frame member lying closely adjacent the axes of rotation of the wheels of the carriage unit and the drag line conduit is attached directly thereto.

With the present invention, the drag line is supplied with irrigation water from the main irrigation pipe via a connecting conduit. However, the need for an elaborate filtering system is eliminated in that the connecting conduit has an inlet which opens within the passageway of the main irrigation pipe to a position which is spaced from the bottom wall of the pipe so that particulate matter accumulating along the bottom of the pipe will not flow into the inlet. Preferably, the connecting conduit projects through a wall of the main irrigation pipe to position the inlet thereof at a central region of the passageway in radially spaced relationship to the wall of the main irrigation pipe.

The present invention also provides a connector or coupling which is particularly adapted for releasably joining the conduit sections of the drag line conduit and for interconnecting the risers to the drag line conduit. The connector is of the quick connect type and employs a double lug type of attachment to prevent relative turning of the conduit sections about their longitudinal axes to thereby assure that the water will be sprayed from the drag line in an even pattern on both sides thereof. The connector can be operated by merely turning of the clip member through about 90° or less.

The connector also eliminates the need for a special drain apparatus therein in that a portion of the drag line conduit extends through an opening in the connector into the interior thereof with a slight clearance space therebetween. A chevron seal surrounds the conduit within the connector and also engages the body of the connector so that when there is fluid pressure within the connector the chevron seal expands to tightly close the clearance space; however, when the water pressure is turned off, the seal returns to its unstressed condition in which it permits leakage through the clearance space to thereby automatically drain the portion of the system connected thereto.

The present invention also provides a novel clutch which is particularly adapted for use with an irrigation system of this type. The clutch can be easily disengaged by pulling one member thereof axially and then rotating it through a few number of degrees. Although this motion is easily accomplished by a workman who wishes to disengage the clutch, it is extremely unlikely that this compound movement would occur inadvertently to thereby inadvertently disengage the clutch. The clutch is of simple construction and requires basically only an input member, an output member and minor variations in the cross-sectional shape of the drive shaft. When the clutch of this invention is utilized in an irrigation system, only one of them is required for each carriage unit as the output member of the clutch can be easily drivingly connected to both of the wheels of the carriage unit.

The present invention also teaches that assembly of the pipe sections which form the main irrigation pipe can be facilitated by providing pipe supporting means on each of the carriage units for supporting the adjacent or confronting ends of the pipe sections while they are being assembled. This can be advantageously accomplished by providing a generally radially extending lug on each of the confronting ends of the pipe sections and suitable lug receiving and supporting means on the carriages. The lugs rest in the last mentioned means while the pipe sections are being bolted, or otherwise secured together.

The invention, both as to its organization and method of operation together with further features and advantages thereof may best be understood by reference to the following description taken in connection with the accompanying illustrative drawing.

DESCRIPTION OF THE PREFERRED EMBODIMENTS

Figure 1:
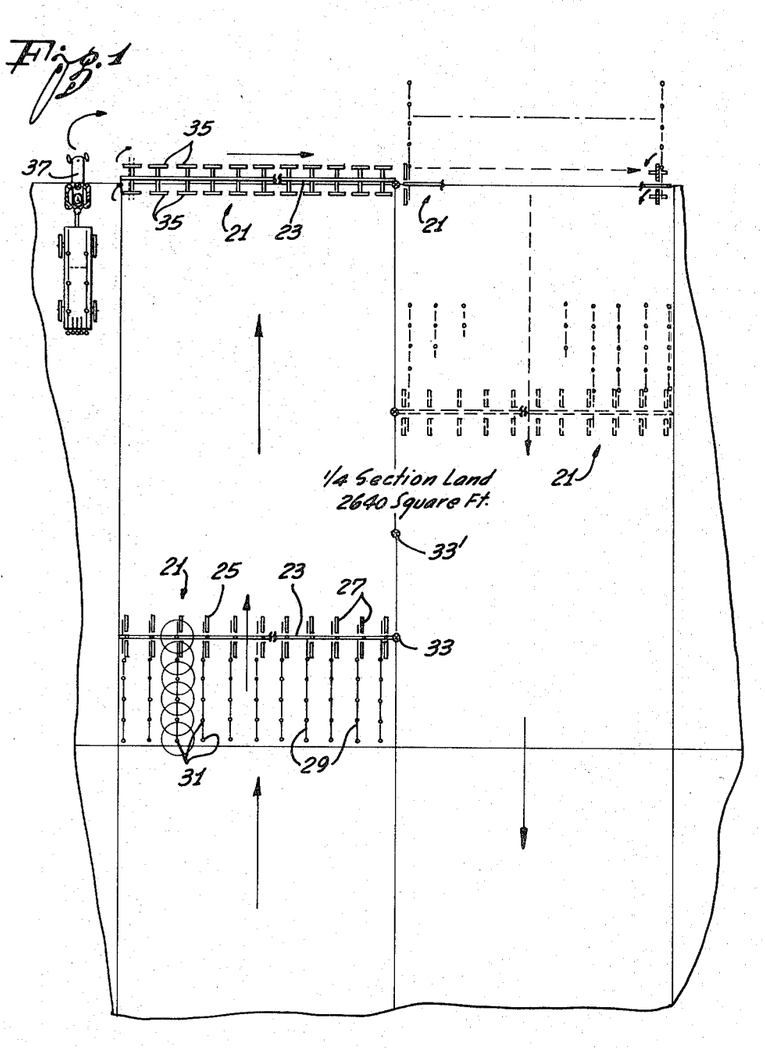
FIG. 1 is a schematic view illustrating how an irrigation system constructed in accordance with the teachings of this invention may be utilized to irrigate a field of substantial size.

Referring to the drawings and in particular to FIG. 1 thereof, reference numeral 21 designates an irrigation system constructed in accordance with the teachings of this invention. Generally, and as shown in FIG. 1, the system 21 includes a main irrigation pipe 23, one or more power carriage units 25 and several driven carriage units 27. The main irrigation pipe 23 is supported by the carriage units 25 and 27 and a plurality of drag lines 29 may be attached to the several carriage units with each of the drag lines carrying a plurality of spaced sprinklers 31. In the position shown in the lower lefthand corner of FIG. 1, the main irrigation pipe 23 is connected to a source of irrigation water by a fixed valve 33.

The water flows through a valve 33, the main irrigation pipe 23, the drag lines 29, and the sprinklers 31 to thoroughly irrigate the surface area therebelow. When this area has been adequately irrigated, the pipe 23 is disconnected from the valve 33 and the power unit 25 is operated to move the entire system 21 forward to a second position or station at which the pipe 23 can be connected to a water supply valve 33'. The system 21 moves intermittently or steps for the full length of the field and, when the end of the field is reached, the wheels 35 of the system 21 are indexed, or turned through 90°, as shown in the upper lefthand corner of FIG. 1. The drag lines 29 are removed and an external power source such as a tractor 37 or a self-propel mechanism (not shown) mounted on the system 21 are utilized to move the main irrigation pipe 23 axially to an adjacent swath at which point the wheels are returned to their initial position and the drag lines 29 are again assembled onto the system. The system 21 is then moved intermittently through the second swath.

Figures 2, 3, 4:
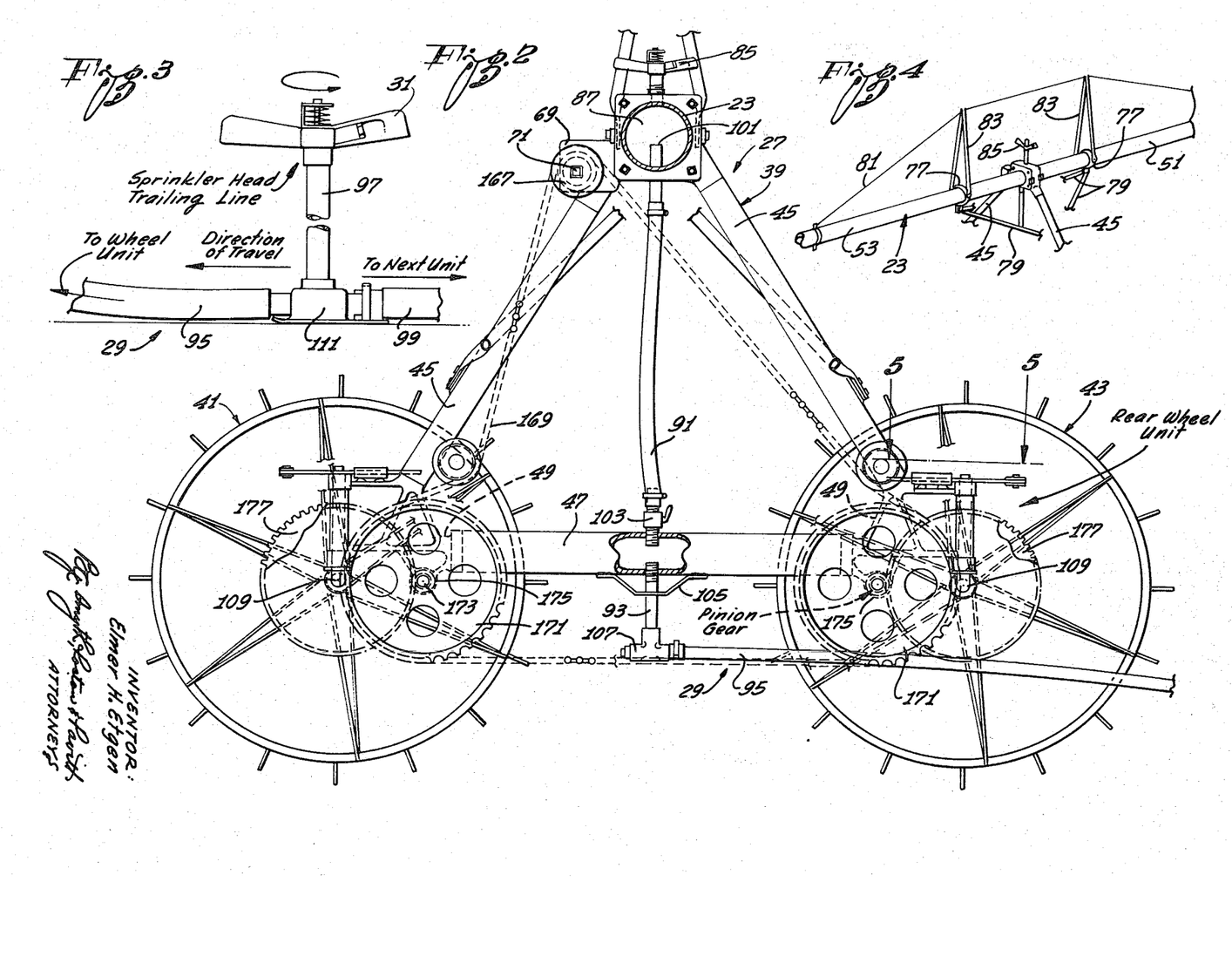
FIG. 2 is a side elevational view with parts thereof in section illustrating one of the driven carriage units.
FIG. 3 is an enlarged fragmentary side elevational view illustrating the connection of the drag line conduit to one of the risers.
FIG. 4 is a fragmentary perspective view illustrating a cable support system for the main irrigation pipe.
Figures 5, 6:
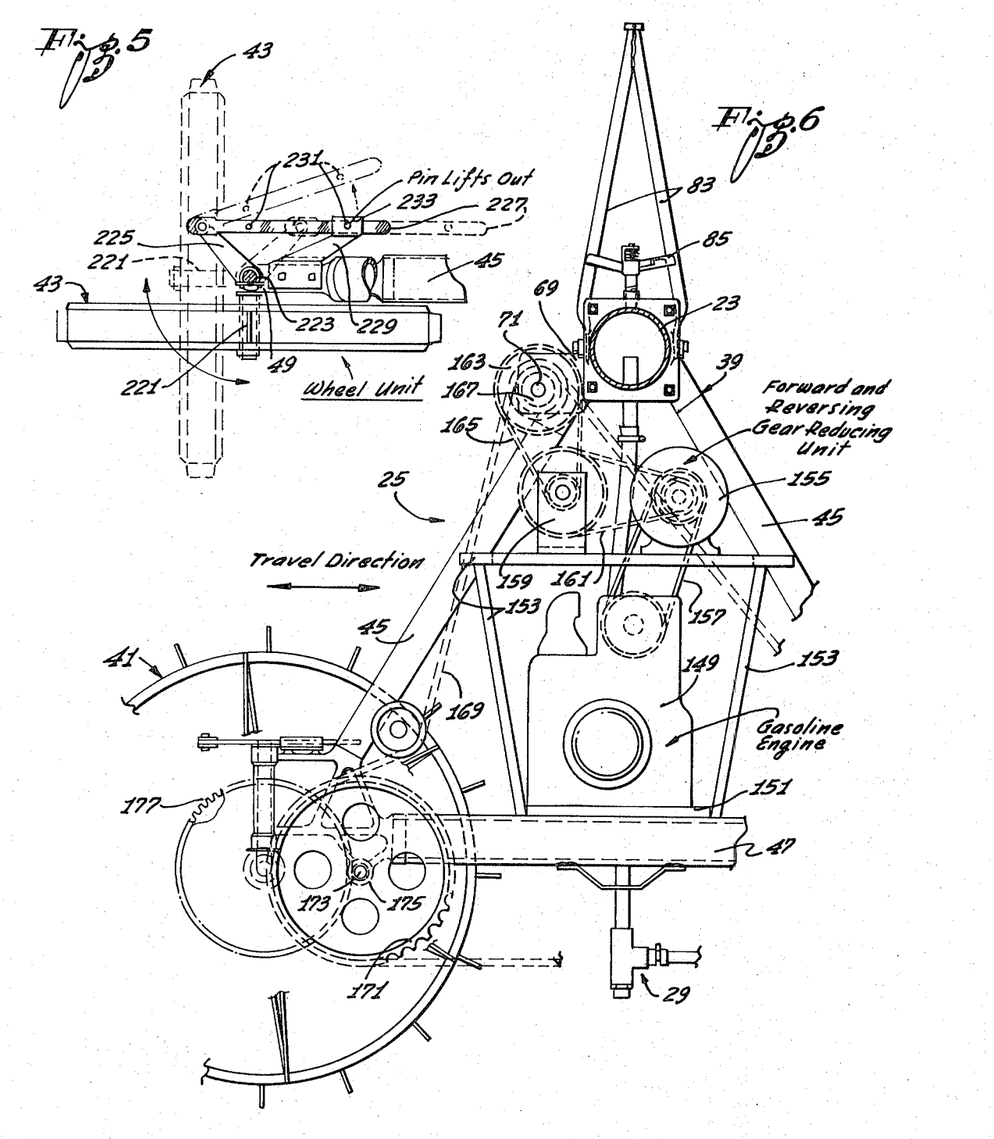
FIG. 5 is a fragmentary top plan view taken along line 5-5 of FIG. 2 and illustrating the means for indexing the wheels of the carriage unit.
FIG. 6 is a fragmentary side elevational view of the power carriage unit having the motor mounted thereon.

FIG. 2 illustrates a typical one of the driven carriage units 27. The carriage unit 27 shown in FIG. 2 includes a frame 39 for supporting the main irrigation pipe 23, a front wheel 41 and a rear wheel 43. The frame 39 includes a pair of struts 45 extending toward each other as they extend upwardly and a horizontal frame member 47 lying just above the rotational axes of the wheels 41 and 43 and joined to the struts 45 at either end of the frame member by brackets 49. The wheels 41 and 43 are mounted on the frame 39 for rotational movement as shown in FIG. 5 and as described more fully hereinbelow.

Figures 7, 8, 9, 10, 11, 11A:
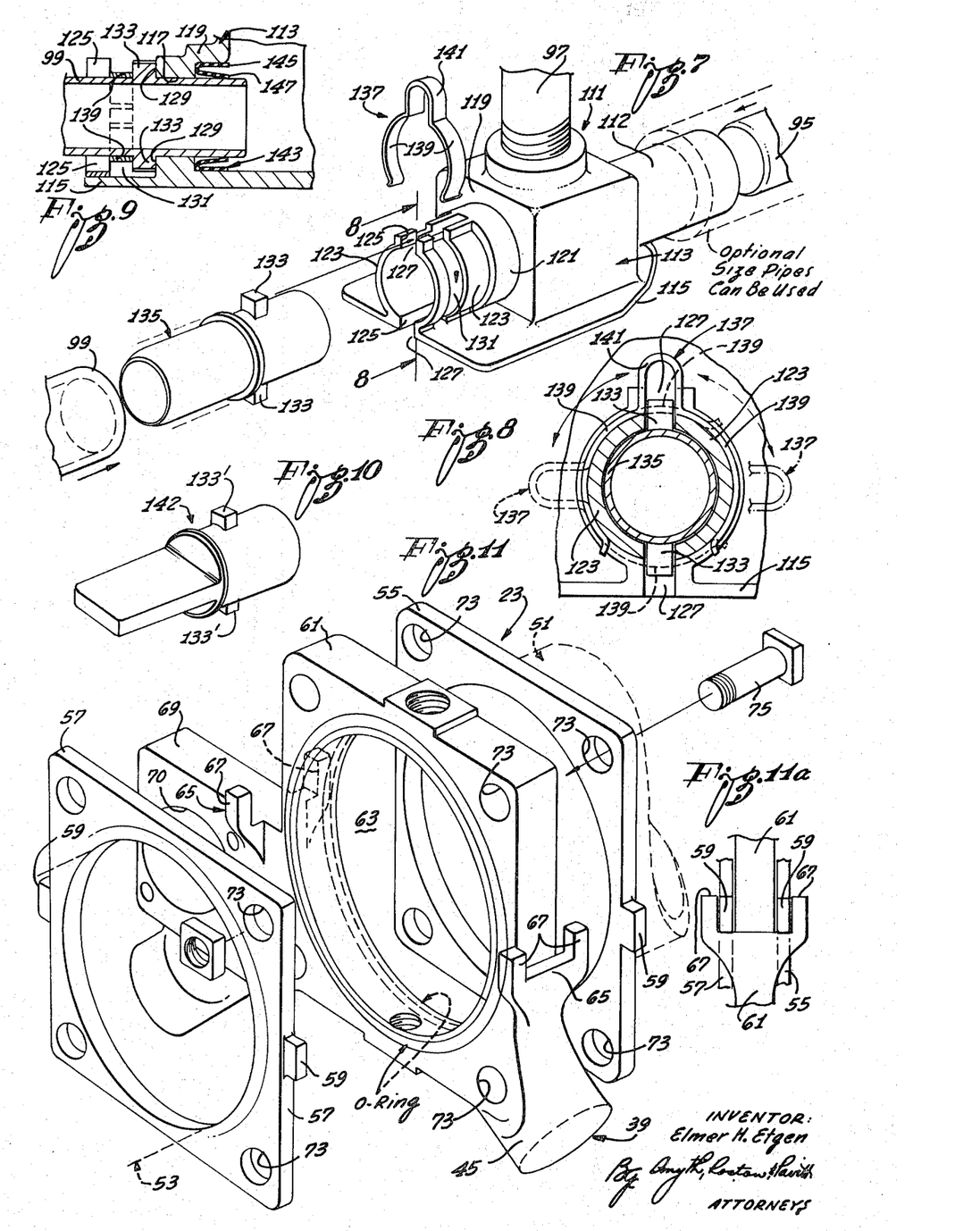
FIG. 7 is an enlarged exploded perspective view of the connector taken from the discharge end of the connector.
FIG. 8 is a sectional view taken along line 8-8 of FIG. 7.
FIG. 9 is a fragmentary sectional view taken along line 9-9 of FIG. 7.
FIG. 10 is a perspective view of a quick disconnect cap which may be used with the quick disconnect coupling to close the discharge end thereof.
FIG. 11 is an exploded perspective view of the means for supporting the confronting ends of the pipe sections during assembly of the main irrigation pipe.
FIG. 11a is a fragmentary side elevational view of the pipe supporting mechanism illustrating the lugs on the pipe section and the cooperating groove on the support.

FIGS. 11 and 11a show how the main irrigation pipe 23 is supported by the frame 39 of the carriage units 25 and 27. The main irrigation pipe 23 includes a plurality of pipe sections, two of which are shown in FIG. 11 and designated by reference characters 51 and 53. Flanges 55 and 57 are suitably mounted on the confronting ends of the pipe sections 51 and 53, respectively, as by welding. Each of the flanges 55 and 57 extend radially outwardly of their respective pipe section and have a pair of diametrically opposed radially extending lugs 59 thereon.

A gasket-like plate 61 having a cylindrical opening 63 therein is supported by the struts 45 and forms a portion of the frame 39. A pair of channel-shaped members 65 having spaced upright legs 67 are provided on opposite sides of the plate 61. Attached to the plate 61 or integral therewith is a block 69 having an aperture 70 therein for supporting a drive shaft 71 (FIG. 2). The flanges 55 and 57 and the place 61 each have a plurality of bolt holes 73 adapted to receive bolts 75 to secure the flanges 55 and 57 together with the plate 61 sandwiched therebetween.

As shown in FIG. 11a, when the main irrigation pipe 23 is being assembled, the lugs 59 may be positioned within the channel-shaped member 65 intermediate the upright legs 67. This automatically aligns the bolt holes 73. The lugs 59 and their associated pipe sections 51 and 53 are, therefore, supported without the need for a workman holding them at the proper elevation during the time that the pipe sections are bolted together.

In addition to bolting the pipe sections 51 and 53 together as shown in FIGS. 11 and 11a, the main irrigation pipe 23 may be further supported as shown in FIG. 4. Collars 77 are provided around the main irrigation pipe 23 on both sides to the joint between the pipe sections 51 and 53 and braces 79 extend between the collars and the struts 45 to provide additional support for the pipe 23. To help prevent sagging of the pipe sections 51 and 53 intermediate the adjacent carriage units 25, a cable 81 is suitably affixed to intermediate sections of the pipe sections 51 and 53 and extends over upright supports 83 which are mounted on the collars 77.

The irrigation system 21 includes suitable conventional sprinklers 85 (FIG. 2) to receive water from the main irrigation pipe 23 and distribute it over the desired area. As shown in FIG. 2, the main irrigation pipe 23 defines a cylindrical passageway 87 through which the irrigation water can flow into the sprinklers 85.

The water distribution system also includes the sprinklers 31 (FIG. 3) mounted on the drag line 29. As shown in FIGS. 2 and 3, the drag line 29 includes a riser 93, a conduit section 95, and a riser 97 (FIG. 3). The drag line 29 is supplied with water from the main irrigation pipe 23 through a connecting conduit 91 and the frame member 47. As shown diagrammatically in FIG. 1 any numbers of the sprinklers 31 may be employed on each of the drag lines 29 and as shown in FIG. 3, a conduit section 99 extends rearwardly to the next sprinkler, and forms a portion of the drag line 29.

The particulate matter in the irrigation water flowing through the passageway 87 of the main irrigation pipe 23 (FIG. 2) tends to accumulate along the bottom of the pipe. To avoid drawing all of this particulate matter into the drag line 29 where it might clog the relatively small orifices of the sprinklers 31, the connecting conduit 91 projects upwardly or radially inwardly substantially beyond the lowermost portion of the passageway 87 to define an inlet 101 of the drag line 29 which opens at a central region on the passageway 87. With this arrangement, only water flowing through the central region of the passageway 87, is drawn into the drag line 29 and such water is much less likely to have any significant amount of particulate matter flowing therein.

The connecting conduit 91 is rigid and extends downwardly from the main irrigation pipe 23 and discharges the water flowing therethrough into the frame member 47 which, as shown in FIG. 2, is a hollow member. A shut-off valve 103 may be provided, if desired, in the connecting conduit 91.

Another feature of this invention is that the drag line 29 is directly mechanically attached to the frame 39 rather than to the main irrigation pipe 23. As shown in FIG. 2, the riser 93 is threadedly secured to the frame member 47 to receive water from the connecting conduit 91. A bracket 105 also serves to firmly connect the riser 93 to the frame member 47. The riser 93 is joined to the conduit section 95 by a quick disconnect coupling 107, the details of which are described more fully hereinbelow in connection with FIG. 7.

An important structural feature of the invention is that the frame member 47 is positioned substantially below the main irrigation pipe 23 and substantially in the same plane as the axes 109 (FIG. 2) of the wheels 41 and 43. With this arrangement, if movement of the drag line 29 becomes resisted as if the sprinklers 31 should become entangled with plants, the force is applied to the carriage unit 27 at a point which is sufficiently low so that the wheels of the carriage will not walk out from under the pipe 23. By way of contrast, if the drag line 29 were directly mechanically joined to the main irrigation pipe 23 as has been done heretofore, movement of the pipe would stop when the drag line 29 became entangled and the wheels 41 and 43 could then walk out from under the pipe 23 thereby tipping over the unit. Although the connecting conduit provides a flow path between the main irrigation pipe 23 and the riser 93, it will be readily appreciated that the conduit 91 is not a structural part of the drag line 29 and that the drag line is structurally directly connected to the frame 39.

Another feature of this invention is the use of a quick disconnect coupling 111 (FIG. 3) to releasably interconnect the conduit 99 and a riser 97. The coupling 111 has a quick disconnect feature which may also appear in the coupling 107 for joining the conduit 95 to the riser 93. The quick disconnect feature may be provided on the inlet and/or the outlet side of the coupling 111 and for simplicity is shown in FIGS. 7—9 on the outlet of the coupling 111, it being understood that a similar or identical quick disconnect means could be provided on the inlet side of the coupling 111 and on the coupling 107.

In the embodiment illustrated the coupling 111 has a forward tubular extension 112 which is suitably rigidly affixed, as by welding to the conduit section 95. The coupling 111 includes a hollow body or housing 113 (FIG. 7) having a threaded opening on the upper side thereof into which the riser 97 is threadedly secured. The housing 113 has a base flange 115 projecting outwardly in all directions from the lower end thereof to provide a relatively broad support surface for the drag line 29. The base flange 115 is adapted to be pulled along the ground when the irrigation system 21 is being moved and is adapted to rest on the ground when the irrigation system is stopped. The base flange has a forward portion 116 which is curved upwardly to facilitate sliding of the coupling 111 along the ground. The broad base flange 115 provides considerable support to resist any tendency of the sprinkler 31 and the riser 97 to pivot about the longitudinal axis of the conduit 95.

The hollow body 13 has an opening 117 (FIG. 9) in an aft wall 119 thereof. A tubular boss 121 (FIG. 7) integral with the aft wall 119 forms an extension of the opening 117 and a pair of arcuate segments 123 are formed integrally with the boss 121 and extend axially of the opening 117 as shown in FIG. 7. Each of the segments 123 terminates in a wall surface or end surface 125 which are spaced circumferentially to form a pair of elongated grooves 127 which are spaced 180° circumferentially from each other. The grooves 125 terminate inwardly at the boss 121 in a surface of the boss which forms a shoulder 129 (FIG. 9). The segments 123 are formed with a circumferentially extending groove 131 which extends completely circumferentially across each of the segments. If desired, the segments 123 may be supported at their lower ends by an aft portion of the base flange 115 as shown in FIGS. 7 and 8.

In order to provide the quick disconnect coupling of this invention, it is necessary that the conduit section 99 which is to be connected to the coupling 111 have a pair of radially extending lugs. Although these lugs may be formed in any desired manner, in the embodiment shown in FIGS. 7—9, a pair of diametrically opposed radially extending lugs 133 are formed on a separate tubular fitting 135 which can be welded to the conduit 99 to form an extension thereof.

To connect the conduit 99 and the coupling 111, the lugs 133 are inserted into the grooves 127, respectively, and urged toward the hollow body 111 until they abut the shoulders 139 as shown in FIG. 9. At this point, an end portion of the conduit 99 will project into the interior of the hollow body 111 as shown in FIG. 9. A spring clip 137 is then forced into the groove 131. As shown in FIGS. 7 and 8, the spring clip 137 includes a pair of arcuate leg portions 139 joined by an inverted U-portion 141 and the opposite ends of the leg portions are disconnected and define an opening. This allows the leg portions 139 to be sprung apart sufficiently wide to snap into the groove 131. The spring clip 137 is then pivoted in the groove 131 until the leg portions 139 lie across the grooves 127 as shown in phantom in FIG. 8 and in full lines in FIG. 9.

As illustrated by the phantom lines in FIG. 8, the spring clip 137 can be pivoted in either direction to position the leg portions 139 across the grooves 127. With the leg portions so positioned, as shown in FIG. 9, the lugs 133 are retained firmly against axial movement by the shoulders 129 and the leg portions 139 of the spring clip 137. The lugs 133 are held against circumferential movement relative to the body 113 by the end surfaces 125 of the arcuate segments 123. Thus, the hollow body 113 and the conduit 99 are positively retained against significant relative axial or circumferential movement. Although only one groove 127 and one lug 133 may be used, it has been found that a far more rigid attachment is provided when at least two of the grooves and cooperating lugs are provided. To allow disconnecting of the conduit 99, it is only necessary to rotate the spring clip 137 to the position shown in full lines in FIG. 8 in which the U-portion 141 is aligned with one of the grooves 127 and the opening between the opposite ends of the leg portions 139 falls across the other groove. Thus, the outer ends of the grooves 127 are open and the lugs 133 can be freely and easily withdrawn therefrom.

The tubular extension 112 into which the conduit 99 is secured is axially aligned with the opening 117. Thus, the hollow body 113 is a "straight through" type of housing in that both the inlet and outlet thereof are axially aligned.

The length of the drag line 29 can be varied to suit various irrigation requirements, and to this end with the conduit section 99 disconnected from the coupling 111, the outlet of the coupling may be closed off by a plug or cap 142 (FIG. 10). The plug 142 has lugs 133′ for entry into the grooves 127 and is otherwise similar to the fitting 135 except that it has an end wall 142a for sealing off the opening 117. The plug 142 can be connected to the coupling 111 in the same manner as the fitting 135.

It is desirable to drain the water from the hollow body 113 and from the conduits and risers connected thereto during periods when irrigation water at high pressure is not being supplied thereto. With the present invention, this function is accomplished by providing a very slight clearance space between the wall of the opening 117 (FIG. 9) and the portion of the conduit 99 extending through such opening. Within the housing 113, a chevron seal 143 is provided around the portion of the conduit 99 lying within the hollow body 113. The chevron seal is generally U-shaped in axial cross section and opens inwardly toward the interior of the housing. The seal 143 has leg portions 145 and 147 which, when there is no significant fluid pressure within the housing 113 do not engage the conduit 99 and the housing 113 with sufficient force to seal the clearance space between the conduit 99 and the wall of the opening 117. However, when the irrigation system 21 is in operation and water under pressure is being forced therethrough, the pressure of the water within the housing 113 is sufficient to force the leg portions 145 and 147 of the seal 143 against the housing 113 and the conduit 99, respectively, to seal off the small clearance space. When water under pressure is no longer being supplied to the drag line 29, the seal 143 returns to its normal unstressed condition in which leakage through the clearance space can occur to drain the housing 113. Thus, an automatic drain feature is provided without the necessity of providing a separate drain mechanism.

The self-propulsion portion of the irrigation system includes the power unit 25, some details of which are shown in FIG. 6. The power unit 25 is substantially identical to the driven units 27 and corresponding reference characters are used to denote corresponding portions of these two units. The power unit 25 differs from the driven units 27 in that the former has a gasoline engine 149 suitably mounted on a support plate 151 which is suitably affixed to and forms a portion of the frame 39. In the embodiment shown in FIG. 6, the support plate 151 rests on the frame member 47 and is further supported by structural members 153.

The engine 149 drives a gear reducing unit 155 through an endless member which may be in the form of a chain 157. Further speed reduction is obtained by a unit 159 which is driven by a chain 161 which in turn drives a sprocket 163 affixed to the drive shaft 71 by means of a chain 165. Of course, the driving train between the engine 149 and the drive shaft 71 may take various other forms, if desired.

The drive shaft 71 is elongated and extends from the power unit 25 to all of the driven units 27 for the purpose of supplying driving power to the driven units. The drive shaft 71 preferably is in the form of several interconnected drive shaft segments.

Each of the carriage units 25 and 27 has a clutch 167 (FIGS. 2 and 6) which is mounted on the shaft 71 adjacent the block 69 of the frame and which is shown in detail in FIGS. 12—15. The clutches 167 can be operated to selectively drivingly connect or disconnect the drive shaft 71 and the wheels 41 and 43 of the carriage units. With the drive shaft 71 rotating and the clutch therefor engaged, the wheels of the power unit 25 will be driven by a chain 169 which is directly driven by the output from the clutch 167. Similarly, with the clutches 167 of the driven units 27 engaged, the wheels 41 and 43 of each of the driven units 27 (FIG. 2) is driven by a chain 169. The chain 169 of both the units 25 and 27 drives large sprockets 171 adjacent the forward and rear wheels, respectively. The sprockets 171, as shown in FIG. 2, are mounted on shafts 173 to which a pinion 175 is affixed. Each of the pinions 175 drives a relatively large driven gear 177 which may be directly affixed to the shaft on which the associated wheel is mounted. Although other drive trains may be used, the form illustrated is preferred to the extent that a single one of the clutches 167 is provided for each of the units 25 and 27 and a single chain 169 can be used to drive both of the wheels 41 and 43.

Figures 12, 13, 14, 15:
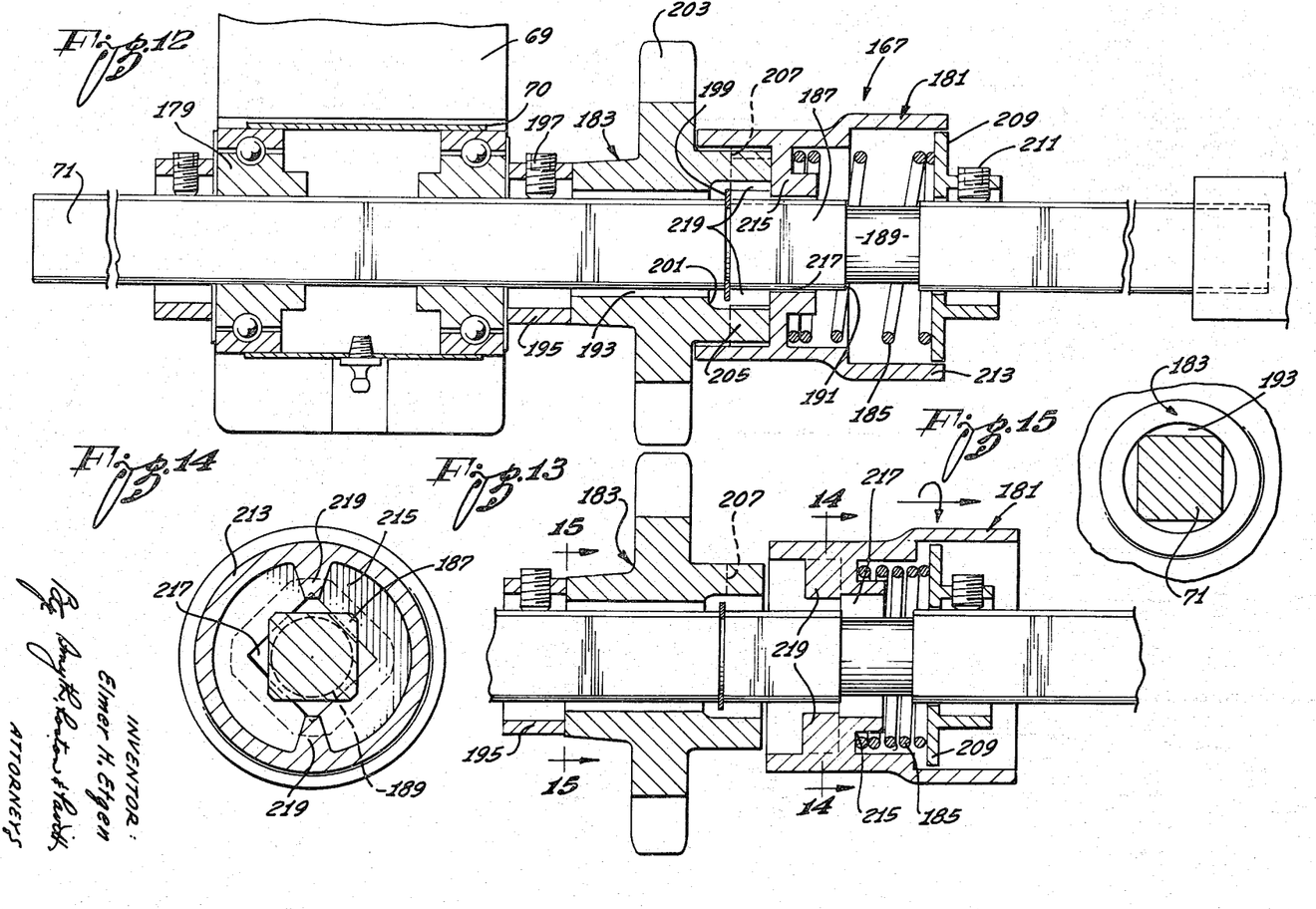
FIG. 12 is a longitudinal sectional view through a clutch constructed in accordance with the teachings of this invention and being shown in the driving position.
FIG. 13 is a fragmentary sectional view of a portion of the clutch with the clutch being illustrated in the disengaged position.
FIG. 14 is a sectional view taken along line 14-14 of FIG. 13.
FIG. 15 is a sectional view taken along line 15-15 of FIG. 13.

The details of the clutch 167 are shown in FIGS. 12—15. The drive shaft 71 is supported in an opening 70 of the block 69 of the frame 39 by a bearing 179 (FIG. 12). The clutch 167 is mounted on the shaft 71 adjacent the bearing 179. Generally, the clutch includes an input member 181, an output or driven member 183, and a spring 185 for urging the members 181 and 183 into driving engagement. The clutch 169 also includes a first portion 187 of the drive shaft 71 having a noncircular cross section, which, in the embodiment illustrated is substantially square, and a second portion 189 of the shaft 71 being of lesser cross-sectional area than the first portion 187 and which in the embodiment illustrated is of circular cross section. The shaft 71 at the juncture of the two shaft portions 187 and 189 defines a shoulder 191.

The output member 183 has an internal bore 193 of sufficiently large cross-sectional area so that it can freely rotate on the shaft 71 and will not be driven in rotation directly by the shaft 71. The output member 183 is confined against significant axial movement by a collar 195 which is fixed to the shaft 71 by a set screw 197. Axial movement of the output member 183 in the opposite direction is prevented by a retaining ring 199 mounted on the shaft 71 and engageable with an internal annular shoulder 201 of the output member 183. The periphery of the output member 183 defines a sprocket 203 for driving the chain 169, although it could define a gear or other suitable type of driving member. The output member 183 has a tubular projecting portion 205 which extends toward the input member 181 and which defines a plurality of recesses or grooves 207 each of which opens toward the driving member 181.

The input member 181 is also mounted on the drive shaft 71, but the input member can also move axially of the shaft 71 within the limits provided by a retainer 209, which is fixed to the shaft 71 by a set screw 211 and as permitted by the projecting tubular portion 205. The input member 181 includes a generally tubular shell 213 and a web 215 integral with the shell and projecting radially inwardly therefrom. An aperture 217 of noncircular cross section and of the type which will form a driving connection with the shaft portion 187 is formed through the web 215 (FIGS. 13 and 14). In the embodiment illustrated, the aperture 217 is square and sized to fit over the square shaft portion 187 to form a good driving connection, but loose enough to permit axial sliding movement of the input member 181 along the shaft 71. The aperture 217 is large enough to fit loosely over the round portion 189 of the drive shaft 71 as shown in FIG. 14 so that no driving connection therebetween is made when the web 215 lies radially outwardly of the round portion. The input member 181 also has a pair of radially inwardly extending lugs 219 formed adjacent the web 215 on the side thereof nearer the output member 183.

When the clutch 167 is in the driving position shown in FIG. 12, the aperture 217 receives the square portion 187 of the shaft 71 and thus the input member 181 will rotate with the shaft 71. The spring 185 bears against the web 215 to urge the input member to the left as viewed in FIG. 12 to thereby maintain the driving connection between the input member and the drive shaft 71.

Also, in the driving position shown in FIG. 12 the two lugs 219 on the input member 181 are received within the recesses 207 of the output member 183 to thereby form a driving connection between the members 181 and 183, which driving connection is maintained by the spring 185. Thus, the input member 181 transmits power from the drive shaft 71 to the output member 183 to cause rotation thereof which may be utilized to drive the chain 169 (FIGS. 2 and 6).

To disengage the clutch, the workman grasps the input member 181 and moves it axially to the right against the biasing action of the spring 185 as shown in FIG. 13. Such axial movement of the input member 181 moves the lugs 219 out of the recesses 207 to break the driving connection between the members 181 and 183, and also moves the aperture 217 off of the square portion 187 and around the round portion 189 of the drive shaft 71 to thereby break the driving connection between the drive shaft and the input member. To releasably lock the clutch in the disengaged position, the input member 181 is then rotated relative to the drive shaft 71 until the web 215 engages and bears against the shoulder 191 at the juncture of the shaft portions 187 and 189. That is, the square aperture 187 is indexed circumferentially as shown in FIG. 14 so that the aperture is not in registry with the square portion 187 of the drive shaft. The spring 185 resiliently biases the web 215 against the shoulder 191 and the force of friction between the web and the shoulder maintain the clutch in the disengaged position shown in FIGS. 13 and 14. It will be appreciated that only a slight amount of rotational movement of the input member 181 is required to move the square aperture 217 out of registry with the square portion 187 of the drive shaft. As disengagement of the clutch 167 requires axial movement of the input member 181 against the force of a spring 185 followed by a predetermined limited amount of pivotal movement of the input member relative to the drive shaft 71, it is virtually impossible to inadvertently disengage the clutch.

To engage the clutch 167, the workman simply rotates the input member 181 relative to the drive shaft 71 through a small number of degrees to place the aperture 217 in registry with the square portion 187 of the drive shaft. The spring 185 then automatically urges the input member 181 to the left toward the position shown in FIG. 12.

FIG. 5 illustrates a typical mechanism for indexing the wheels of each of the carriage units 25 and 27. FIG. 5 illustrates a rear wheel 43 of one of the carriage units 27 mounted for rotation on a horizontal shaft 221 to which the sprocket 177 may also be affixed, the sprocket 177 having been omitted from FIG. 5 for clarity. The shaft 221 which defines the rotational axis for the wheel 43 is suitably connected to a vertical shaft 223 which is suitably mounted on the bracket 49 of the frame 39. Also affixed to the vertical shaft 223 is a crank 225 which projects generally horizontally therefrom and has a link 227 pivotally secured thereto at the outer end of the crank. A bracket 229 is rigidly mounted on the bracket 49. The link 227 has a plurality of apertures 231 therein and the bracket 229 has a corresponding aperture adjacent the outer end thereof.

The position of the wheel 43 can be set by dropping a pin 233 into the aperture in the bracket 229 and through one of the apertures 231 in a link 227. As shown in full lines in FIG. 5, the pin 223 is fixing the wheel 43 in the normal position of the wheel for moving the irrigation system 21 through a swath. By removing the pin 223 and manually turning the wheel 43 to the position shown in phantom in FIG. 5 in which the wheel is turned through an angle of 90°, and then placing the pin 233 through the aperture in the bracket 229 and another one of the apertures 231 in the link 227, the wheel 43 can be fixed in the position illustrated in the upper lefthand corner of FIG. 1 for moving of the main irrigation conduit 23 axially thereof to an adjacent swath.

Although exemplary embodiments of the invention have been shown and described, many changes, modifications, and substitutions may be made by one having ordinary skill in the art without necessarily departing from the spirit and scope of this invention.

I claim:

1. In an irrigation system, the combination of:
   a main irrigation pipe;
   a plurality of carriage units, each of said carriage units including a frame and rotatable means engageable with a supporting surface for moving said carriage units, said main irrigation pipe being supportable on said frames of said carriage units;
   an elongated rotatable drive shaft extending between said carriage units and supported thereby;
   motor means for rotating said drive shaft;
   at least some of said carriage units having a clutch for selectively transmitting power from the rotatable drive shaft to the rotatable means;
   each of said clutches including an output member mounted on said shaft for rotation about said shaft independently thereof, an input member mounted on said shaft for axial movement between the driving position and a disengaged position, first means responsive to the movement of said input member to said driving position for drivingly interconnecting said shaft and said input member and said input member and said output member, and second means responsive to movement of said input member to said disengaging position for drivingly disconnecting said input member from said shaft and said output member whereby said shaft can rotate relative to said output member; and
   means for drivingly connecting each of said output members with the rotatable means of the associated carriage unit.

2. A combination as defined in claim 1 including a drag line conduit and means other than said main irrigation pipe for attaching said drag line conduit to said frame of one of said carriage units beneath the main irrigation pipe.

3. A combination as defined in claim 1 wherein said main irrigation pipe includes first and second pipe sections, each of said pipe sections having first and second ends, said first and second pipe sections being arranged with said first ends thereof being in confronting relationship, each of said pipe sections having a generally radially extending lug adjacent the confronting ends thereof, one of said carriage units including a support member with lug receiving and supporting means thereon, said lug being received and supported by said lug receiving and supporting means to thereby support the confronting ends of the pipe sections in closely adjacent confronting relationship to permit rigidly affixing said confronting ends of said pipe sections together.

4. A combination as defined in claim 3 including:
   a drag line conduit;
   means other than said main irrigation pipe for attaching said drag line conduit to said frame of one of said carriage units beneath said irrigation pipe;
   a riser;
   a quick connect coupling for joining said drag line conduit to said riser, said quick connect coupling including a hollow body attached to said riser and defining a groove and said drag line conduit having a lug thereon receivable in said groove, and spring clip means for retaining said lug in said groove;
   said drag line conduit projecting into the interior of said hollow body, a seal within said hollow body surrounding said drag line conduit and engaging said hollow body, said seal being generally U-shaped in axial cross section with the U opening inwardly;

connecting conduit means for supplying water from said irrigation pipe to said drag line conduit, said conduit means having an inlet opening within the passageway defined by said main irrigation pipe with said inlet being spaced from the bottom of the wall of the main irrigation pipe so that particulate matter accumulating along the bottom of the pipe will not flow into said inlet; and said rotatable means of each of said carriage units including front and rear wheels and means for pivoting said wheels through an angle of approximately 90° about a generally vertically extending pivotal axis.

5. In an irrigation system for supporting and transporting an irrigation conduit, the combination of:

a plurality of carriage units, each of said carriage units including a frame for supporting the irrigation conduit and front and rear wheels for moving the irrigation conduit transversely relative to its longitudinal axis;

each of said carriage units including front and rear axles for mounting said front and rear wheels, respectively, for rotation about a generally horizontal axis and front and rear shaft means for pivotally mounting said front and rear axles, respectively, to the frame for pivotal movement about a generally vertical axis to thereby permit turning of said wheels to change the direction of movement of the irrigation conduit; and each of said carriage units including a crank rigidly attached to said front shaft means for pivoting said shaft means and front wheel through at least about 90°, a link pivotally connected to said crank about a generally vertical axis, said frame having a member adjacent said link, means for securing said link to said member at more than one area along said link to thereby fix the position of said front wheel relative to the frame and to permit adjustment of the position of the front wheel relative to the frame.

6. An irrigation system for supporting and conveying a main irrigation conduit comprising:

at least one carriage for supporting and conveying the main irrigation conduit, said carriage including a frame for supporting the irrigation conduit and movable means attached to said frame for moving said carriage and the main irrigation conduit;

a drag line including water distribution means;

means other than the irrigation conduit for attaching said drag line to said frame of said carriage for movement with said carriage whereby tipping of said carriage as a result of arresting or retarding the movement of said drag line is made less likely to occur;

connecting conduit means for supplying irrigation water from the main irrigation pipe to said drag line;

said movable means including rotatable means having a generally horizontal axis of rotation, said irrigation pipe being attached to the member; and adjacent the upper end thereof;

said frame including a hollow frame member lying below the irrigation pipe, said drag line being attached to said frame member; and said connecting conduit means including a supply pipe connecting said frame member and the main irrigation pipe for supplying irrigation water from the irrigation pipe to said frame member.

7. A system as set forth in claim 6 wherein said frame member lies at approximately the same elevation as said axis of rotation.

8. A system as defined in claim 6 wherein said irrigation pipe has a bottom wall and said supply pipe has an inlet within the main irrigation pipe and spaced upwardly from the bottom wall of the irrigation pipe.

9. In an irrigation system movable along a supporting surface, the combination of.

first and second pipe sections, each of said pipe sections having first and second ends, said first and second pipe sections being arranged with said first ends thereof being in confronting relationship;

mobile means for supporting said pipe sections above the supporting surface, said mobile means including a mobile support unit beneath said confronting ends of said pipe sections;

each of said pipe sections having a generally radially extending lug adjacent the first end thereof;

said mobile support unit including a support member with lug receiving and supporting means thereon, said lug receiving and supporting means receiving and supporting said lugs of said pipe sections to thereby support the confronting ends of the pipe sections in closely adjacent confronting relationship to permit rigidly affixing said confronting ends of said pipe sections together; and each of said pipe sections having a peripheral flange at the confronting end thereof, said lugs being carried by said flanges.

10. In an irrigation system movable along a supporting surface, the combination of:

first and second pipe sections, each of said pipe sections having first and second ends, said first and second pipe sections being arranged with said first ends thereof being in confronting relationship;

mobile means for supporting said pipe sections above the supporting surface, said mobile means including a mobile support unit beneath said confronting ends of said pipe sections;

each of said pipe sections having a generally radially extending lug adjacent the first end thereof;

said mobile support unit including a support member with lug receiving and supporting means thereon, said lug receiving and supporting means receiving and supporting said lugs of said pipe sections to thereby support the confronting ends of the pipe sections in closely adjacent confronting relationship to permit rigidly affixing said confronting ends of said pipe sections together; and said support member including a tubular member which lies intermediate the confronting ends of said pipe sections and said lug receiving and supporting means including an upwardly opening groove means mounted on said tubular member.

11. A combination as defined in claim 10 wherein each of said pipe sections has a flange mounted thereon adjacent the confronting end thereof, said lugs being carried by said flanges.

12. An irrigation system movable along a supporting surface comprising:

first and second pipe sections, each of said pipe sections having first and second ends, said first and second pipe sections being arranged with said first ends thereof being in confronting relationship;

each of said pipe sections having a flange adjacent said first end thereof;

fastener means cooperable with said flanges for interconnecting said flanges;

mobile means for supporting said pipe sections above the supporting surface, said mobile means including a mobile support unit beneath said confronting ends of said pipe sections;

projection means on one of said support unit and said flanges; and recess means on the other of said support unit and said flanges for releasably receiving said lug means to thereby support said pipe sections on said support unit to allow said fastener means to be operated to interconnect said flanges.